Feb. 7, 1933.  E. A. ROCKWELL  1,896,374
FLUID PRESSURE BRAKE
Filed Dec. 9, 1927  4 Sheets-Sheet 1
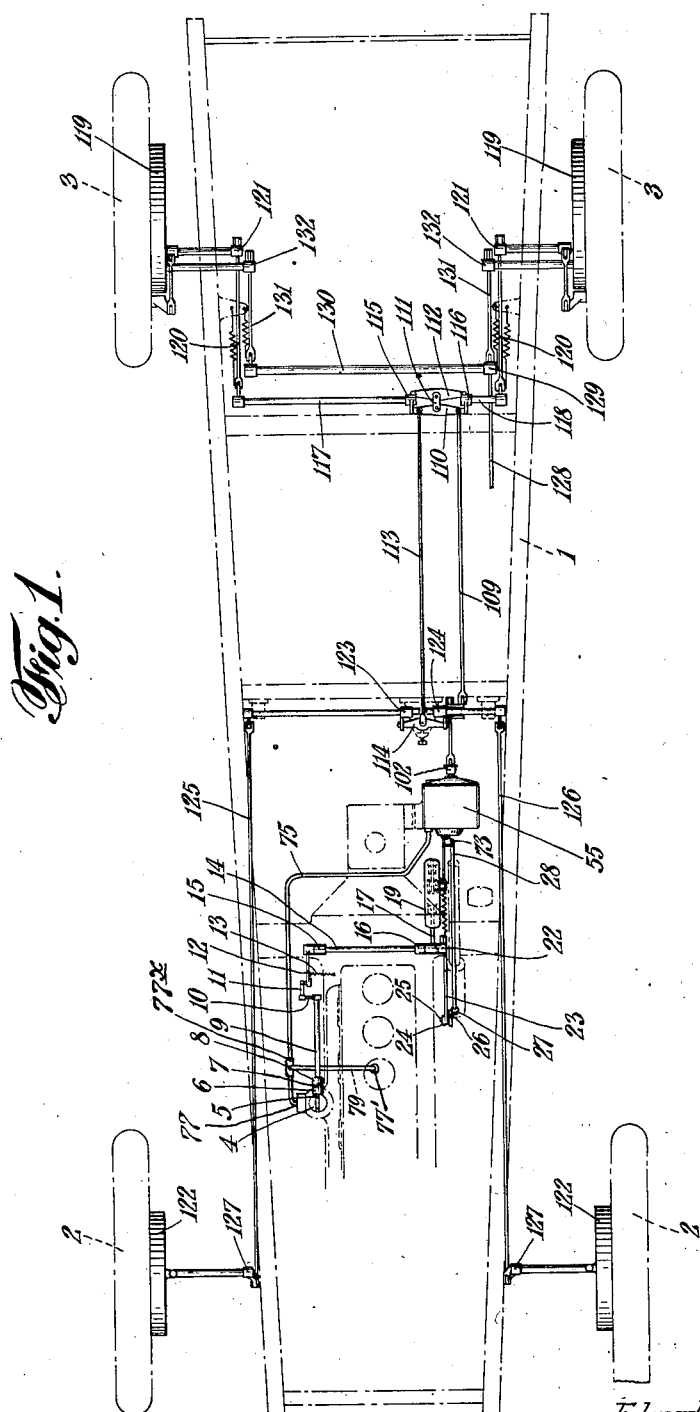
INVENTOR
Edward A. Rockwell.
BY Burton Burton
his ATTORNEYS Feb. 7, 1933.  E. A. ROCKWELL  1,896,374
FLUID PRESSURE BRAKE
Filed Dec. 9, 1927   4 Sheets-Sheet 2
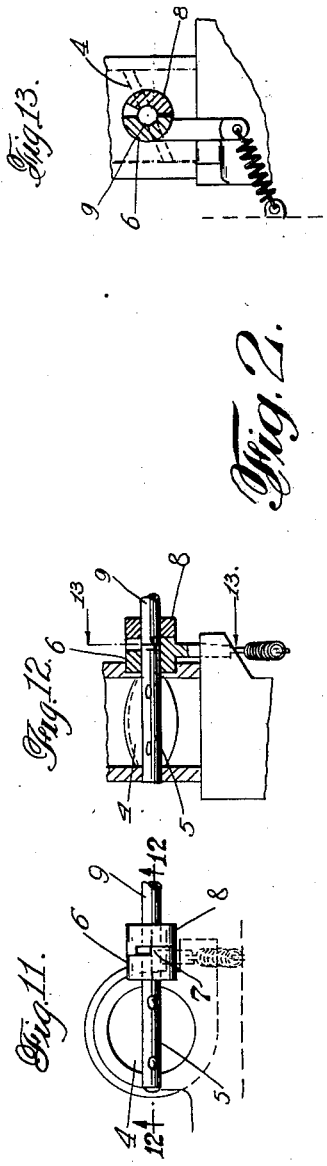
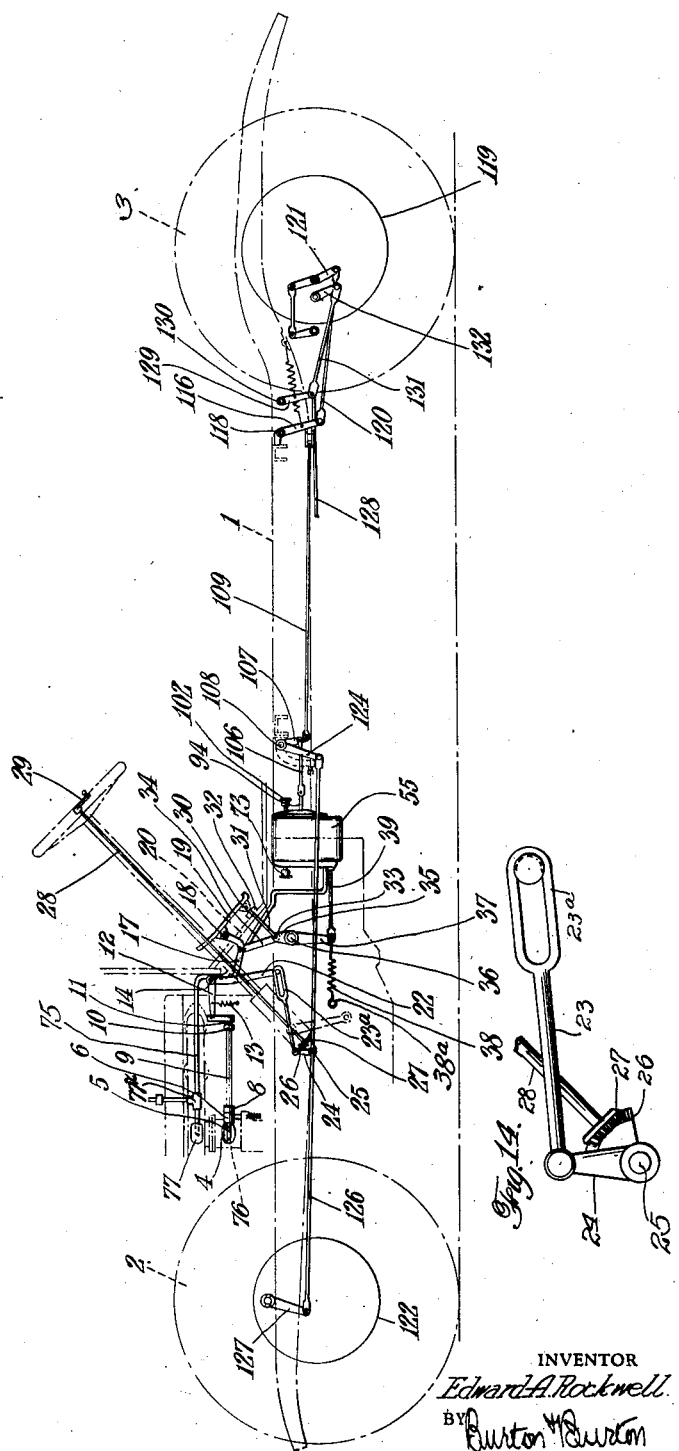
INVENTOR
Edward A. Rockwell
BY Burton Burton
his ATTORNEYS

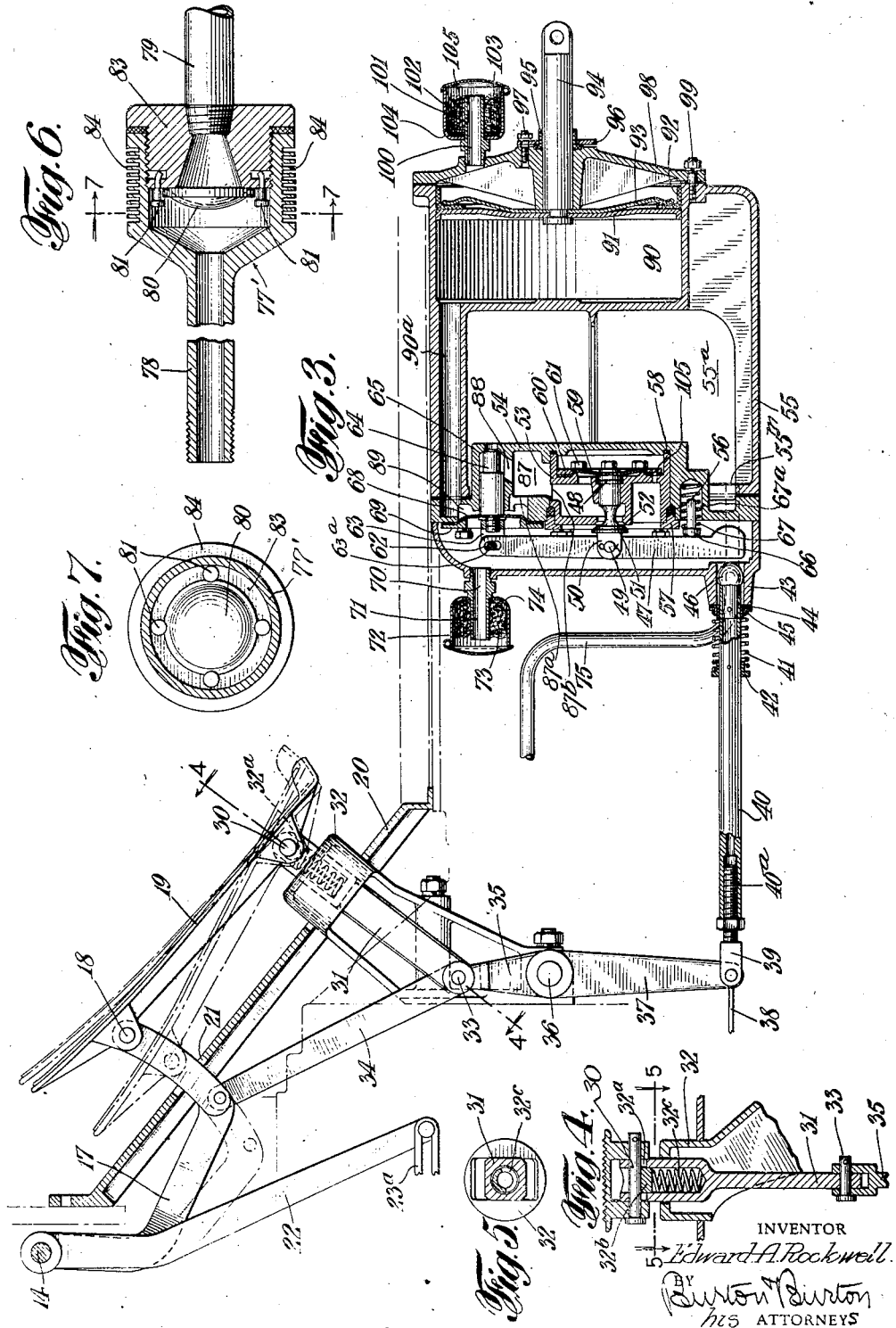

Feb. 7, 1933.  E. A. ROCKWELL  1,896,374
FLUID PRESSURE BRAKE
Filed Dec. 9, 1927  4 Sheets-Sheet 4
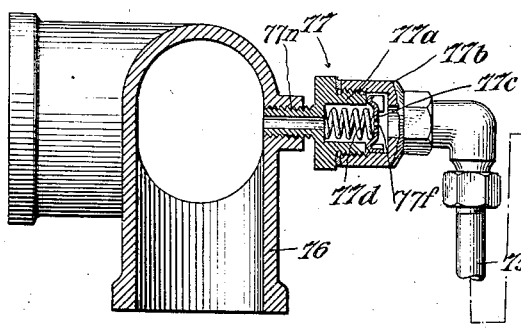
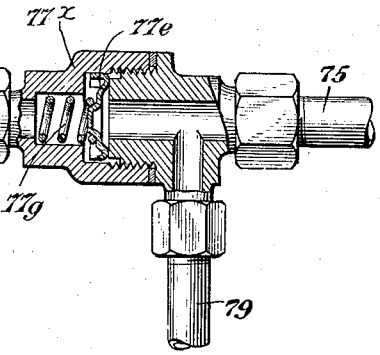
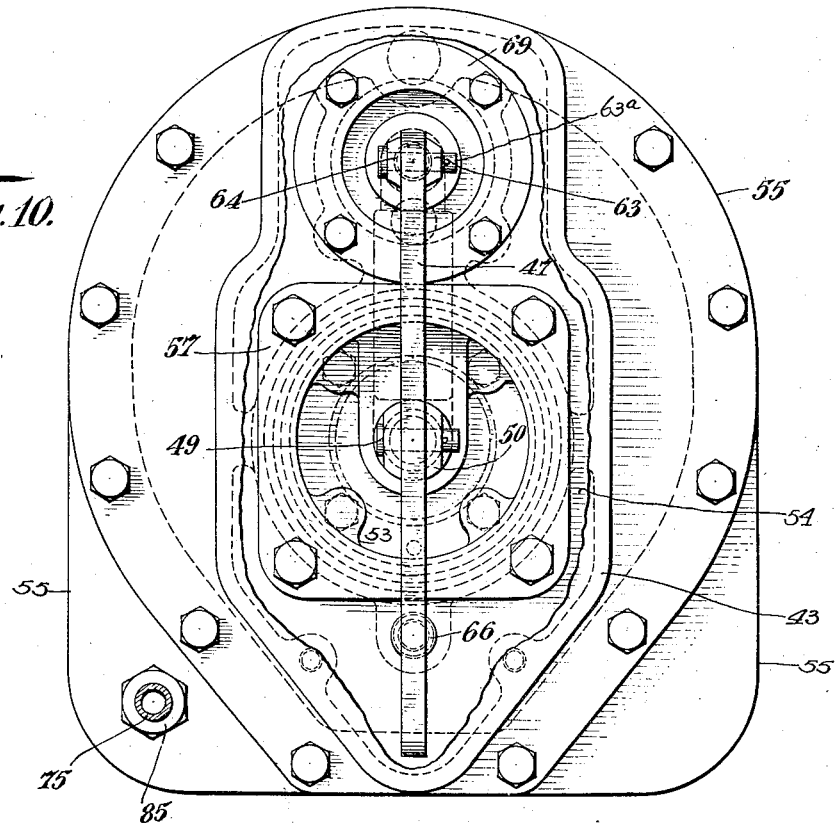
INVENTOR
Edward A. Rockwell.
BY Burton Burton
his ATTORNEYS Patented Feb. 7, 1933

1,896,374

UNITED STATES PATENT OFFICE

EDWARD A. ROCKWELL, OF LONG ISLAND CITY, NEW YORK

FLUID PRESSURE BRAKE

REISSUED

Application filed December 9, 1927. Serial No. 238,828.

My invention relates particularly to mechanism adapted to control the application of power, and has especial application for use in connection with brakes such, for example, as automobile brakes.

The object of my invention is to provide a power controlling mechanism in which the control of the power is accomplished by controlling the pressure applied, both on the pressure-applying and pressure-releasing movements. The construction is such, furthermore, that in the release of the pressure-control the pressure will be shut off at any particular pressure up to a certain maximum pressure. This construction, furthermore, provides an instantaneous release especially due to the large passages admitting the pressures. Furthermore, the preferred construction utilizes the vacuum of the engine; but any source of vacuum can be utilized. This pressure control system is applicable to any variation from the atmospheric pressure generally; but it is especially useful with sub-atmospheric pressure or vacuum, and particularly when the sub-atmospheric pressure is derived from the intake manifold of the engine; for the reason that a vacuum reserve is obtained and maintained sufficient for quick and maximum operation of the brakes by communication with the source of vacuum so limited that the engine operation is not impaired by deriving the vacuum from that source, as will be liable to happen if in each instance in applying the brake the necessary vacuum were derived directly from the intake manifold. With the construction shown the operation is that a reserve vacuum is built up and maintained by the continuously open communication of the reserve chamber with the intake manifold which builds up the vacuum in the reserve chamber between the intervals of braking.

Further objects of my invention will appear from the detailed description of the same hereinafter.

While my invention is capable of embodiment in many different forms, for the purpose of illustration I have shown only one form of the same in the accompanying drawings, in which,—

Figure 1 is a plan view of an automobile chassis which is equipped with my invention.

Figure 2 is a side elevation of the same (the engine being shown in phantom).

Figure 3 is a vertical section through a portion of the same.

Figure 4 is a detail shown in section taken on the line 4—4 of Figure 3.

Figure 5 is a section taken on line 5—5 of Figure 4.

Figure 6 is a sectional view of a trap valve used in connection with my invention.

Figure 7 is a detail section on lines 7—7 of Figure 6.

Figure 8 is a section showing the check valve controlled connection from a source of vacuum in the intake manifold.

Figure 9 is a section showing a second check valve controlled connection used therewith.

Figure 10 is an elevation of the vacuum chamber with the front cover partly broken away.

Figure 11 is a detail on a larger scale of certain parts shown on Figure 1.

Figure 12 is a section at the line 12—12 on Figure 11.

Figure 13 is a section at the line 13—13 on Figure 12.

Figure 14 is a detail elevation on a larger scale of certain parts shown on Figure 2.

In the drawings I have shown a chassis, 1, of an automobile having front wheels, 2, and rear wheels, 3. On the chassis, 1, I have provided an internal combustion engine of any desired type, having all the usual elements, including a carburetor, as well as a throttle valve, 4, for controlling the carburetor. The throttle valve, 4, is mounted on a shaft, 5, which carries a sleeve, 6, having at one end a stop shoulder, 7, for cooperating with a complementary sleeve, 8, having a like stop shoulder, said sleeve 8 being carried by a shaft, 9, aligned with the shaft, 5, and the sleeves having their respective stop shoulders relatively positioned to permit a certain amount of relative rotation of the two aligned shafts in bringing the shoulders into engagement. The shaft, 9, is operated by an arm, 10, connected by a link, 11, to a lever arm, 12, normally held downwardly by a spring, 13, secured at one end to the engine body. The arm, 12, is tight on a shaft, 14, carried by journal bearings, 15 and 16, also mounted on the engine. At the other end of the shaft, 14, there is an arm, 17, which is approximately U-shaped, and the other end of which is connected by a pivot, 18, to a foot pedal, 19, supported above a floor board, 20, of the automobile. The upper end of the lever, 17, passes through an opening, 21, in the floor board, which is kept closed in any desired manner around the lever, 17. In order that the throttle valve, 4, may be operated not only by the foot pedal, but also from the steering column, there is provided a lever, 22, on the end of the shaft, 14, which is fixed to the shaft 14 adjacent the connection of the lever 17 and is connected to the link 23 which is provided with an elongated slot 23a to receive the lower end of the lever 22. It will, therefore, be apparent that the lever 22 may be moved without movement of the link 23 but movement of the link 23 will positively move the lever 22 to operate the throttle. The link 23 is connected to a lever, 24, on a shaft, 25, provided with a bevel gear, 26, meshing with a bevel gear, 27, on a shaft, 28, having the usual hand lever, 29, for moving the carburetor throttle.

The other end of the pedal, 19, has near the heel of the same a pivot, 30, connected to a link, 31, which passes through a housing 32 extending through the floor board, 20. An amount of play between the pedal, 19, and the link, 31, is provided by means of a slot, 32a, in the link, 31, through which the pivot, 30, passes, so that the latter rests upon a plug, 32b, pressed upwardly by a spring, 32c. The other end of said link, 31, is connected to a pivot, 33, on a link, 34, which is also pivoted to the U-shaped lever, 17. The said pivot, 33, also making pivotal connection of both links, 31 and 34, with the end of a short lever, 35, on a shaft, 36, from the other side of which there is extended a longer lever, 37, both said levers being tight on said shaft.

To the lower end of the lever, 37, there is attached one end of a stretched spring, 38, whose other end is attached to the engine body, as seen at 38a, so that the spring reacts to restore the foot pedal, 19; and at the other side of said lever, 37, it is connected by link 39 and adjustable connection 40a to a plunger, 40, which operates valve mechanism hereinafter described contained in a casing, 55, controlling the access of sub-atmospheric pressure derived from any suitable source, as the intake manifold of the engine as hereinafter described, to a cylinder and piston comprised and contained in said casing, 55, as hereinafter described. The stem of the piston protruding from the casing, as seen at 94, is connected by a link, 106, to a lever, 107, which is carried by a shaft, 108, journalled on the chassis of the car. The end of the lever, 107, is provided with a brake-operating rod, 109, connected at its rear end to a link, 110, for equalizing the front and rear brakes, the middle of said link being supported by a link, 111, from the middle of the link, 112, which equalizes the rear brakes.

The other end of the link, 110, is connected by a rod, 113, to a link, 114, for equalizing the front brakes. It will be noted that the link, 112, is connected at its two ends to levers, 115 and 116, on shafts, 117 and 118, respectively, which are adapted to operate the brakes on drums, 119, on the rear wheels by any suitable linkage indicated at 120 and 121. Similarly, the link, 114, is arranged to operate the front brakes, 122, through the aid of levers, 123 and 124, links, 125 and 126, and levers, 127. At the same time, it will be understood that the usual emergency hand brake may be provided which is adapted to operate a separate set of brakes by means of a link, 128, leading to levers, 129, on a shaft, 130, which is provided with links, 131, and levers, 132, for operating a band brake device on the interior of the drums, 119 in case the other brakes are located on the outside of said drums.

The valve mechanism for controlling the sub-atmospheric pressure access to the piston cylinder for operating the vacuum brake connections will now be described.

The plunger, 40, is made adjustable in length by comprising two parts screwed together, as seen at 40a. A spring, 41, is provided reacting against a stop, 42, on the plunger, 40, and at its other end against the face of a cover plate, 43. A leather washer, 44, is located around the plunger, 40, and held in place by a retainer, 45, for rendering air-tight the joint between the cover and the plunger. The plunger is terminated at the inner end with a ball, 46, for accommodating the slight angular changes in position of the lower end of the lever, 47, located within the cover, 43, with which lever the plunger is to cooperate as will be explained. At its central portion the lever, 47, is connected by a pivot, 49, to a valve rod, 50, having a stop washer, 48, thereon, and provided with a valve, 51, cooperating with a valve seat, 52, in an inner valve casing, 53, which is in turn carried in a casing, 54, which is mounted as a closure for and protruding into a vacuum chamber, 55a, formed in the casing, 55, in which there is also formed a piston cylinder, 90, which intrudes into the chamber, 55a, at the rear, and is in communication by a passage, 90a, formed in the side wall of the chamber, 55a, with a chamber, 87, hereinafter mentioned.

In the cylinder, 90, there is provided a piston, 91, whose stem, 94, above mentioned, for operating wheel brakes, as described, extends out through a cover member, 98, clamped to the casing, 55, by screws, 99. The piston, 91, is provided with a suitable cup-leather, 92, held in place by a disk spring 93, and the stem, 94, is provided with a leather packing, 95, held in place on the cover by washer 96 and screws, 97. The rear face of the piston is at all times exposed to atmospheric pressure through a port, 100, carrying a tube, 101, in a housing, 102, forming a chamber, 103, having air vents, 104, and containing air filtering material, 105. A packing ring, 56, makes a tight joint between the valve casings, 53 and 54, and a retainer ring, 57, holds the packing ring, 56, in place. For the same purpose, a further packing ring, 58, is located at the inner end of the casing 53 between the same and the wall of the casing, 54. At its inner end the valve rod, 50, is connected to a diaphragm, 59, which is held in place by a ring, 60, and screws, 61. At its upper end the lever, 47, has a slot, 62, forming a pivotal connection 63ª with an upper valve stem, 63, and carrying at the other end a valve, 64, cooperating with a valve seat, 65, in the outer valve casing, 54, and controlling communication of the chamber, 87, with the sub-atmospheric pressure chamber, 55ª. It will be noted that the valve 51, has a larger area than the valve, 64, so that the action of equal vacuum upon the two valves will not be balanced; and in addition there is a tendency for the valve, 51, to be unseated due to the plunger, 66, which is carried within a compressed spring, 67, housed in a pocket, 67ª, provided for it in the outer valve casing, 54, said plunger, 66, being arranged so as to press against the lower end of the lever, 47. The purpose of this feature of the construction will hereinafter appear.

The forward end of said valve stem, 63, is connected to a diaphragm, 68, held in place by a clamping ring, 69, on the outer valve casing, 54. The forward face of this diaphragm, 68, is always exposed to atmospheric pressure through a port, 70, from which a tube, 71, leads to a housing, 72, forming an air filtering chamber, 73, having atmosphere vent shown at 74, and containing filtering material.

The chamber 87 is in communication between the interiors of the valve casings 53 and 54 through the port 87ᵇ and with the valve seat 65 which is controlled by the valve 64 through the port 88. Finally the pressure in chamber 87 is communicated to the passage 90ª through the ports 87ª and 89. Thus the vacuum depression which acts against the piston produces a differential in pressure between the atmosphere and the vacuum depression which produces the movement of the piston, and is subjected to the interior of the chamber 87 against the inner surfaces of the diaphragms which are attached to the valves. Each of the diaphragms is exposed on the exterior to atmospheric pressure. Since the diaphragms are of larger area than their corresponding valves, a differential pressure is produced which acts on each valve to move it to its normal position. Therefore, the valve 64, as the vacuum depression is admitted, tends to move to closed position while the valve 51 tends to move to open position. The pressure moving the valves to operative position must therefore increase as the differential operative pressure is built up and it is for this reason that the operator may variably control the brake pressure by his foot upon the pedal.

A condition of sub-atmospheric pressure or vacuum is produced in the chamber of the casing, 55, by connection with the intake manifold of the engine, as by the pipe, 75, leading from connection with the manifold, seen at fitting, 77, in Figure 2, to the vacuum reservoir in the casing, 55, as seen at 55ᵐ, on Figure 3. For properly controlling the communication of vacuum, the valves shown in detail in Figures 8 and 9 may be employed. The valve construction shown in Figure 8 comprises the fitting, 77, connected to the intake manifold at 77ⁿ, said fitting having a chamber formed between two screwed-together parts, 77ª and 77ᵇ, and including therein a disc valve, 77ᶜ, bowed for stiffness to resist the excess of atmospheric pressure over the sub-atmospheric pressure of the intake manifold, and seating at the end of the fitting member, 77ª, but with an interposed spring, 77ᵈ, tending to hold said valve off said seat. This disc valve has a very small port, 77ᶠ, for permitting restricted air flow even when the valve is seated, the spring being of suitable stiffness to hold the valve off its seat and permit free flow of air around it into the manifold when the suction is low, as when the engine is running with wide open throttle, but to permit it to be seated by the suction when the suction is high, as when the engine is idling with the throttle valve nearly closed, under which latter condition the access of air inflow is restricted to the flow capacity of the port, 77ᶠ; and the vacuum transmitted to the vacuum chamber in the casing, 55, is restricted accordingly.

In the pipe, 75, between the fitting, 77, and the connection of said pipe, 75, to the casing, 55, there is interposed a check valve fitting, 77ˣ, seen in detail in Figure 9, from which it may be understood without further specific description that said check valve, 77ᵉ, in said fitting is adapted to be held seated by the spring, 77ᵍ, except when opened by atmospheric pressure in opposition to the sub-atmospheric pressure of the intake manifold, this valve thus serving to retain beyond it, that is, on the side away from the intake manifold, whatever degree of vacuum may have been produced by the flow inward past it at any state of high vacuum in the intake manifold. The construction comprising the cooperating check valve-controlled connections 77 and 77ˣ shown in Figures 8 and 9 may be desirably used together with a pipe connection 79 from pipe line 75 to an engine cylinder and including therein a check valve device, as shown in Figures 6 and 7, or the pipe connections 75 and 79 together with the check valve device, as shown in Figures 6 and 7, may be used entirely independent of the connection to the intake manifold.

In Figure 6 there is shown a valve device which may be employed with advantage for similar purpose, that is, for building up the vacuum by forming the connection between the pipe 79 and the engine cylinder. This device is sometimes called a "vacuum trapping valve", and consists of a fitting, 77′, provided with a duct 78 adapted to be connected to the engine cylinder and a pipe connection 79 which extends to the pipe line 75 on the reservoir side of the check valve 77ᵉ. The fitting 77′ includes therein a disc valve, 80, bowed for stiffness and seated at its concave side away from the source of suction, which may be a selected cylinder of the engine, said valve being retained with short range of movement toward and from its seat, 83, by any suitable means, as the headed pins, 81, hooked at their inner end for engaging the seat of the valve, the range of movement of the valve being from its seat to the heads of the pins. The mode of action of this device for the purpose stated is that at the peak of suction in the cylinder to which the connection is made, the valve is opened and suction is communicated past it, producing vacuum on the side toward the vacuum reservoir; but the valve is immediately seated as the suction in the cylinder passes the peak and declines toward atmospheric pressure, and the valve is held seated thereafter during the pressure stroke of the piston, to be again opened upon the next suction stroke, each suction stroke tending to build up the vacuum beyond the valve, so that the vacuum may eventually by this means approximate the degree of vacuum in the cylinder at the suction peak. Since this device would be exposed to the hot engine gases in the pressure stroke of the piston, it is constructed with heat-radiating fins, 84, for cooling.

In the operation of the combined pedal 19, it will be apparent that a depression of the toe to the dotted line position of Figure 3, will move the link 17 and rotate the cross shaft 14, thus opening the throttle and speeding up the engine. With such opening of the throttle, the manifold suction is decreased. Depression of both heel and toe simultaneously is prevented by the linkage connections, including the link 34. As the heel is depressed to apply the brakes, the toe lifts slightly to the upper dotted position. Thus the throttle is closed and manifold suction at a maximum at the time at which the brakes are applied.

Therefore the means employed for building up the high vacuum in the reservoir for operating the brakes includes the communication to the intake manifold which is provided with a spring-pressed check valve 77ᵉ which serves to trap the high vacuum on the reservoir side and will not open to pass air into the intake manifold except during periods of high suction in the manifold or low vacuum in the reservoir. The communication to the intake manifold includes adjacent the intake manifold a normally opened check valve which is seated by the high suction in the intake manifold but is provided with a restricted opening therethrough to permit the exhaustion of air from the reservoir even when the valve is seated. This valve prevents passing a large amount of air into the intake manifold. It will be apparent that during conditions of atmospheric pressure in the intake manifold there will be no exhaustion of air from the reservoir and it is for this reason that I have employed an additional connection from the reservoir to one of the engine cylinders provided with a check valve for trapping the vacuum on the reservoir side.

The operation of the valve mechanism and fluid pressure connections as above described is as follows:

The chamber, 55ᵃ, being continuously in communication for deriving sub-atmospheric pressure from the engine intake,—whether the intake manifold or one cylinder of the engine,—through the pipe, 75, upon depression of the heel of the pedal by the operator the connection described causes the plunger, 40, to actuate the lever 47 at its lower end. At this stage the valve, 64, is held seated by atmospheric pressure on the diaphragm, 68, as against sub-atmospheric pressure on the inner end of the valve, 64; and the valve, 51, is at open position, being held in that position by the lever, 47, in the position seen in Figure 3, by reason of its upper end engagement with the stem, 63, of the valve, 68, and its lower end pressed to the left by the reaction of the spring, 67, on the pin, 66, against whose head the lever, 47, rests, the valve, 51, at this stage being balanced as to pressure on the diaphragm, 59, which is exposed on both sides to atmospheric pressure. The inthrust of the plunger, 40, first seats the valve, 51, at its seat, 52, whereupon the pivot, 49, becomes the fulcrum, and further inthrust of the plunger, 40, rocking the lever over that new fulcrum causes it to withdraw the valve, 64, from its seat admitting sub-atmospheric pressure to the chamber, 87, and thence by the port, 87ᵃ, past the diaphragm, 68, and through the port, 89, and passage, 90ª, to the cylinder, 90, wherein it operates for instroke of the piston by excess of atmospheric pressure over the sub-atmospheric pressure thus admitted.

Now it will be understood that the sub-atmospheric condition in the chamber, 55ª, will be reproduced in the chamber 87, upon opening the valve, 64, and maintaining it open any substantial length of time to permit the gas to pass the port, 65, for equalizing the pressure at opposite sides of that port; and since one purpose of the present invention is to cause the braking pressure exerted by the vacuum brake to be proportionate to the pressure applied at will by the pedal, which purpose will be defeated if, whenever the valve, 64, is opened, it could remain open long enough and wide enough to allow the full degree of vacuum existing in the vacuum chamber, 55ª, to be reproduced in the chamber, 87, and thereby in the piston cylinder, 90, such equalization of pressure is prevented by the construction shown which operates as follows:

The sub-atmospheric pressure admitted, as described, to the chamber, 87, is experienced on the inner side of the diaphragm, 68, which is exposed at the outer side to atmospheric pressure, which thereupon tends to force the diaphragm inward and close the valve, 64; and it will be seen, therefore, that when the valve, 64, has been opened by the thrust of the plunger, 40, as described, it will be closed as soon as the depression in the chamber, 87, and at the inner side of the diaphragm, 68, is such as to make the force due to atmospheric pressure over the relatively large area of the diaphragm operative for closing the valve, and on the upper end of the lever, 47, for rocking it over its fulcrum, 49, exceed the force applied by the plunger, 40, at the other end of the lever for opening the valve. It thus results that if slight pressure is applied by the pedal to the plunger, 40, the valve, 64, will stay open only for a very brief instant, while the depression in the chamber, 87, and in the piston cylinder becomes only a small fraction of that in the vacuum chamber, 55ª, and the piston will therefore apply only a correspondingly small pressure to the wheel brakes. But if the operator depresses the pedal and continues to hold it down with extreme pressure of his foot, he may hold the valve, 64, open until the depression in the chamber, 87, and in the piston cylinder is nearly or even quite that in the vacuum chamber, 55ª; and the piston will therefore apply to the wheel brakes the maximum pressure derivable from the vacuum in the chamber, 55ª.

In this connection it is to be noted that the vacuum trapping device described, tends to produce in the vacuum chamber, 55ª, not merely the vacuum at any given instant existing in the engine cylinder from which the vacuum is derived, but rather to build up the vacuum in the chamber, 55ª, and maintain it at the maximum or peak vacuum of the cylinder, thus rendering the braking system described exceptionally effective for the widest range of braking action obtainable by the use of engine suction.

When the vacuum brake has been applied to any relatively high degree and the operator desires to relax the pressure, such relaxing of pressure applied by the foot on the pedal operates in the same way as described, with respect to original application of pressure, that is, so that relaxing of the pedal pressure correspondingly relaxes the brake pressure, this result being obtained by the construction as described as comprising the diaphragm, 59, connected with the valve, 51, for actuating the latter in opening direction by the development of the condition of sub-atmospheric pressure in the chamber, 87. For it will be seen upon consideration of the structure, that when a given depression has been produced in the chamber, 87, by the opening and closing of the valve, 64, as described, since that valve is held closed by the action of the diaphragm, 68, overcoming the force applied by the plunger, 40, in the direction for opening said valve, that result,—holding the valve closed,—is dependent upon the lever, 47, fulcruming at the pivot, 49, by reason of the valve, 51, being held pressed on its seat; and that if the pressure of the plunger on the lever, 47, is relaxed while the valve, 64, is held seated, the action of the diaphragm, 59, on the valve, 51, due to the depression obtained in the chamber, 87, will operate to thrust the valve, 51, open, causing the lever, 47, to fulcrum on its pivotal connection with the valve stem, 63, and yield to the left at the end at which it is held only by the plunger, 40, which, under the condition of relaxed pedal pressure, will yield and permit the pedal to move to the left and permit the valve, 51, to open. But the slightest opening of the valve, 51, admitting atmospheric pressure and reducing the degree of vacuum in the chamber, 87, will make the force exerted by the plunger again sufficient to close the valve, 51; and thus when the pressure in the chamber, 87, and thereby in the piston cylinder, 90, is reduced to correspond to the reduction of pressure exerted on the pedal, it will become static until further reduction in the pedal pressure permits further venting of the vacuum in the chamber, 87; and thus the braking pressure applied by the piston in the cylinder will be reduced as the pedal pressure is reduced just as it was originally developed proportionately to the pedal pressure.

In detail it will be obvious that the normal position of the valves is that the fluid pressure controlling valve 64 is closed while the venting valve 51 is open and that there will be a slight differential in pressure tending to maintain the valve 64 closed due to the fact that atmospheric pressure acts against the diaphragm while the reduced pressure acts against the end of the valve but the valve 51 will be balanced by the atmospheric pressure acting thereon. If the operator desires to lightly apply the brakes, a slight pressure on the foot pedal tending to rotate the lever 27 and inwardly move the plunger 40, will produce pressure on the lower end of the lever 41 thereby moving the lever against resistance of spring 67 and initially seating the venting valve 51. After the valve 51 has become seated, the lever 47 will fulcrum about its pivotal connection therewith and produce an opening movement of the valve 64. As the pressure in the chamber 87 becomes reduced, it will be apparent that more and more pressure will be required to hold the valve 64 open and, therefore, if the operator maintains the same pressure on the foot pedal, the pedal will be slightly raised by the closing of valve 64. If further braking is desired, the operator increases the foot pressure to hold the valve 64 in open position until a higher effective differential pressure acts upon the working piston 91. If the operator relaxes the pressure upon the foot pedal, the valve 64 will be immediately closed and the venting valve 51 will be automatically opened after the closure of valve 64 since there will be a differential in pressure tending to produce opening of the valve 51. As the valve 51 is opened, the chamber 87 is vented and the foot pedal pressure will again become sufficient to close the valve 51 and open the valve 64. Thus a variable control of the braking pressure is obtained in both directions of movement of the foot pedal.

I claim:

1. In an apparatus for the purpose indicated, in combination with a source of fluid pressure, mechanism adapted to be operated by said pressure for work-performing movement; means operable at will and connections therefrom for controlling the communication of said fluid pressure with said mechanism variably, said connections comprising means for venting in part the pressure admitted and adapted to reduce the ratio of venting to communication as the access for said communication is increased.

2. In an apparatus for the purpose indicated, in combination with a source of fluid pressure, mechanism adapted to be operated by said pressure for work-performing movement; a reservoir for maintaing said fluid pressure in reserve, said reservoir having continuous restricted communication with said source, means operable by pressure variably at will for putting said mechanism in communication with said fluid pressure reserve, the operating connections from said means being adapted to effect communication variably according to the variation of the pressure applied at will, said connections comprising means for venting in part the pressure admitted and adapted to reduce the ratio of venting to communication as the access for said communication is increased.

3. In a construction for purposes of the character indicated, a source of vacuum; a piston chamber and a piston reciprocal therein, means for controlling communication of the piston chamber with the source of vacuum comprising a chambered casing having its chamber in communication with the vacuum source and having a valve controlling said communication, said chamber having a vacuum vent port and a valve controlling said port; flexible diaphragms forming part of the wall of the chamber and connected to said valves respectively for controlling said seating and unseating, lever means for operating said valves by the same movement for closing the vent valve and opening the vacuum-controlling valve, and means operable for actuating said lever varyingly at will.

4. In the construction defined in claim 3, a casing comprising integrally the vacuum reservoir and the piston cylinder, and housings for the diaphragm walled chambers and valves.

5. In the construction defined in claim 3, the vacuum inlet and vent valves each having its stem and guide bearing at the vacuum side of the diaphragm; whereby leakage around the stem at the bearing is avoided.

6. Apparatus for doing work by fluid pressure comprising a source of fluid pressure different from the atmosphere, work-performing means adapted to be moved by the differential in pressure between the atmosphere and said fluid pressure, a normally closed valve for controlling the communication of said fluid pressure to said work-performing means, a normally open valve for venting the communication between said normally closed valve and said work-performing means, means associated with each valve exposed on one side to atmospheric pressure and on the other side to the fluid pressure acting on said work-performing means and arranged to move the valve by the differential in pressure towards the normal position thereof and means for variably applying pressure to operate said valves.

7. Apparatus for doing work by fluid pressure comprising a source of pressure different from the atmosphere, work-performing means adapted to be moved by the differential in pressure between the atmosphere and said fluid pressure, a normally closed valve for controlling the communication of said fluid pressure to said work-performing means, a normally open valve for venting the communication between said normally closed valve and said work-performing means, a diaphragm attached to each valve exposed on one side to atmospheric pressure and on the other side to the fluid pressure acting against said work-performing means and arranged to move the valve by the differential in pressure towards the normal position thereof and means for variably applying pressure to operate said valves.

8. In combination with an internal combustion engine, means adapted to be operated by the differential between the atmospheric pressure and vacuum pressure, a vacuum reservoir for trapping the vacuum pressure, a connection from said reservoir to the intake manifold of the engine, a normally closed check valve in said connection adapted to be opened to exhaust air from the reservoir during suction conditions in the intake manifold, a normally open check valve in said connection on the manifold side of said first-mentioned check valve adapted to be seated during conditions of high suction in the intake manifold and means permitting a restricted flow through said connection when said second-mentioned check valve is seated.

9. In combination with an internal combustion engine, a vacuum trapping reservoir, work performing means adapted to be actuated by the differential in pressure between the atmospheric pressure and vacuum derived from said reservoir, a communication between said reservoir and the intake manifold of the engine, a pair of spring-pressed check valves in said communication, one of said check valves being arranged adjacent to said intake manifold and adapted to be held normally open by the force of its spring, the second of said check valves being between said reservoir and the other check valve and arranged to be normally seated by the force of its spring, whereby said first-mentioned check valve is seated against the force of its spring during conditions of high suction in the intake manifold and means permitting a restricted flow past said first-mentioned check valve while it is seated.

10. In an apparatus as described in claim 6, the means for variably applying pressure to operate said valves including a lever pivotally connected at one end to one of said valves and intermediately fulcrumed to the other of said valves, resilient means normally assisting in holding said lever in released position and selectively operable means for applying pressure to the other end of said lever.

11. In an apparatus as described in claim 7, the means for variably applying pressure to operate said valves including a lever pivotally connected at one end to one of said valves and intermediately fulcrumed to the other of said valves, resilient means normally assisting in holding said lever in released position and selectively operable means for applying pressure to the other end of said lever.

12. Apparatus for doing work by fluid pressure comprising a source of pressure different from the atmosphere, work-performing means adapted to be moved by the differential in pressure between the atmosphere and said fluid pressure, a valve casing having a chamber therein forming a communication between said source of fluid pressure and said work-performing means, a normally closed valve guided for movement by said valve casing and adapted to control the admission of fluid pressure to said chamber, a normally open valve guided for movement by said valve casing and controlling the venting of said chamber, a flexible diaphragm attached to each valve and secured in sealing relation to said valve casing, each of said diaphragms being exposed on the exterior to atmospheric pressure and on the interior to the fluid pressure which acts against the work-performing means whereby the differential in pressure tends to move each of the valves to normal position and means for variably applying pressure to operate said valves.

In testimony whereof, I have hereunto set my hand at Chicago, Ill., this 3d day of December, 1927.

EDWARD A. ROCKWELL.

CERTIFICATE OF CORRECTION.

Patent No. 1,896,374. February 7, 1933.

EDWARD A. ROCKWELL.

It is hereby certified that error appears in the printed specification of the above numbered patent requiring correction as follows: Page 4, line 16, beginning with "In" strike out all to and including the word "cylinder." in line 20; and that the said Letters Patent should be read with this correction therein that the same may conform to the record of the case in the Patent Office.

Signed and sealed this 9th day of May, A. D. 1933.

M. J. Moore.

(Seal) Acting Commissioner of Patents.